United States Patent [19]

Herold et al.

[11] 4,372,907

[45] Feb. 8, 1983

[54] METHOD FOR MANUFACTURING PLASTIC ELECTRICAL INSULATORS

[75] Inventors: Georg Herold, Lichtenfels; Hermann Kabs, Nuremberg, both of Fed. Rep. of Germany

[73] Assignee: Siemens Aktiengesellschaft, Munich, Fed. Rep. of Germany

[21] Appl. No.: 226,351

[22] Filed: Jan. 19, 1981

[30] Foreign Application Priority Data

Jan. 29, 1980 [DE] Fed. Rep. of Germany ....... 3003095

[51] Int. Cl.³ .............................................. B29D 31/00
[52] U.S. Cl. ................................ 264/265; 264/271.1; 264/272.15; 264/328.2; 264/DIG. 54
[58] Field of Search .............. 264/328.2, 328.4, 328.5, 264/DIG. 54, 265, 271.1, 272.15

[56] References Cited

U.S. PATENT DOCUMENTS 2,446,872  8/1948  Ehlers ......................... 264/328.2 X
4,243,628  1/1981  Herold ..................... 264/DIG. 54 X Primary Examiner—Thomas P. Pavelko
Attorney, Agent, or Firm—Kenyon & Kenyon

[57] ABSTRACT

A method for fabricating a plastic electrical insulator having a fiberglass-reinforced plastic core rod and a plurality of insulator discs disposed thereon. The insulator discs are formed of a plastic molding compound which is especially suited for outdoor use. In accordance with the invention, the insulator rod is disposed in, and passes through, a mold which, when closed, is filled with the plastic molding compound for forming the insulator discs. The separation plane of the mold is situated near the outermost edge of each disc. Subsequent insulator discs are individually formed so as to partially overlap a previously molded insulator disc.

4 Claims, 5 Drawing Figures

METHOD FOR MANUFACTURING PLASTIC ELECTRICAL INSULATORS

BACKGROUND OF THE INVENTION

This invention relates generally to methods for manufacturing electrical insulators, and more particularly, to a method for molding insulator discs around a fiberglass-reinforced plastic core.

Known methods for manufacturing electrical insulators, of the type having one or more plastic discs surrounding a plastic core, utilize sintering, centrifuging or casting techniques. Generally, a plastic rod which serves as a core is places so as to be at least partially disposed within a mold, and the entire outer surface of the insulator, including the insulator discs, is formed therein. The complexity of the method and the need for expensive molds results in considerable manufacturing costs.

Other known methods for producing such insulators utilize prefabricated insulator discs which are mounted on a core rod, and which may be joined thereto by adhesives. The resulting insulators have leaks, cracks, and voids which have an adverse effect on the operability of the insulator, and lead to premature failures during operation.

It is, therefore, an object of this invention to provide a method for manufacturing electrical insulators which is simpler and less expensive than known methods.

SUMMARY OF THE INVENTION

The foregoing and other objects are achieved by this invention which provides a method for surrounding an insulator core rod with insulator discs by a molding process such that the separation plane of the mold is located near the edge of the insulator discs.

In embodiments of the invention wherein the insulator core rod is surrounded by a plurality of individual discs, the discs are molded onto the core rod and have portions which at least partially overlap one another. The insulator discs are each configured so as to have a circular outermost drip edge. The resulting insulator discs do not have mold lines on their major surfaces, and are especially resistant to the adverse effects of weather in outdoor use. In addition, insulators manufactured in accordance with the subject method possess greater dielectric strength than insulators manufactured by known methods.

In accordance with the invention, insulator core rods are surrounded with insulator discs by using injection or transfer molding techniques. The method, therefore, uses relatively small disc molds, and consequently, small processing equipment. In addition, the method has the flexibility of forming electrical insulators having either individual or multiple insulator discs. Such flexibility permits efficient and economical production of electrical insulators, particularly suspension-type electrical insulators, for any particular voltage rating or axial length. The electrical insulators are cost-effectively fabricated in large quantities, each insulator disc portion thereon representing a building block of each electrical insulator.

Plastic compounds which are suitable for the fabrication of electrical insulators include compounds with a base of aromatic, cycloaliphatic and heterocyclic epoxy resins, polyurethane and polyester resins, polytetrafluoroethylene (PTFE), polypropylene, or silicone rubber and rubber-modified polyolefins such as ethylene-propylene monomer rubber (EPM) and ethylene-propylene-diene monomer rubber (EPDM). Suitable compounds have been produced by mixing the foregoing compounds with one another, or with other molding compounds of the thermosetting and thermoplastic type. Some known compounds which possess good electrical characteristics under outdoor conditions are described in German Pat. DE-OS No. 2 742 042.

The structural characteristics of the plastic compounds are improved by adding fillers such as quartz meal, aluminum oxide trihydrate, and calcite. Particularly good results have been achieved using short glass fibers as reinforcement material.

In some cases it is advantageous to pretreat the core rods with, for example, grease-dissolving agents and by subsequent sandblasting. Such pretreated rods, and the rod portions which join with the insulator discs, may be provided with hardenable layers, adhesives, or adhesion-promoting agents. Some known substances which are suitable for this purpose are, for example, commercially available primers, adhesion-promoting agents and adhesives, and certain types of silicone rubber. Some embodiments may include elastic inserts disposed between adjacent insulator discs.

In one specific illustrative embodiment, the core rod is placed in a mold so as to be perpendicular to the separation plane of the mold, and the insulator disc is formed thereon. The underside of the insulator disc lies in the mold separation plane, and the mold is filled with molding compound which enters the mold at a point near the separation plane of the mold.

Multiply divided tools, which may be provided with distribution canals, have been found to be particularly suitable for fabricating the electrical insulators in accordance with the invention. The mold is filled with molding compound which is injected at a point near the mold separation line, or by means of a hot canal distributor which injects the molding compound at a region of the mold corresponding to the portion where molded insulator discs overlap one another. A slider tool advantageously permits locking and passage of the insulator rod, as well as direct molding thereon of further insulator discs.

BRIEF DESCRIPTION OF THE DRAWINGS

Comprehension of the invention is facilitated by reading the following detailed description in conjunction with the annexed drawings, in which.

DETAILED DESCRIPTION

Figure 1:
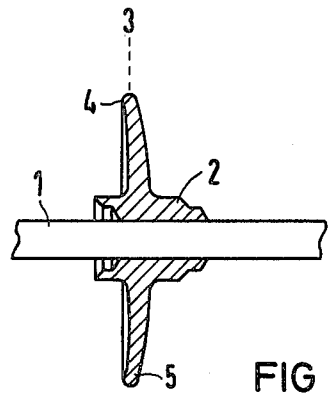
FIGS. 1, 2 and 3 show schematic cross-sectional views of a molded insulator disc on an insulator rod, and different methods for filling a mold.

FIG. 1 shows an insulator core rod 1 having an insulator disc 2, which is arranged so as to surround the insulator core rod. The insulator disc is formed in a mold (not shown) which is arranged so as to have a mold separation plane 3. The insulator disc is configured so as to have a drip edge 4. The insulator disc which is shown in this figure is formed by injecting a molding compound into the mold at location 5, which is near mold separation plane 3.

Figure 2:
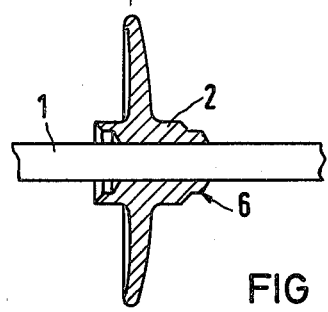

FIG. 2 shows a cross-sectional view of an insulator disc similar to that shown in FIG. 1. In this figure, however, the mold (not shown) is injected with molding compound at a location 6, which is disposed laterally with respect to mold separation plane 3.

Figure 3:
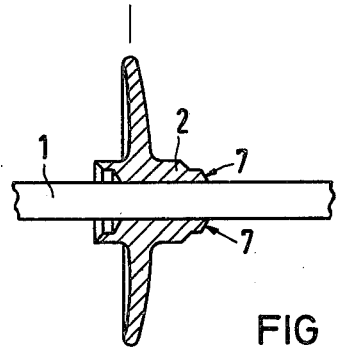

FIG. 3 shows an insulator disc which is similar to those described above in FIGS. 1 and 2, the mold (not shown) being injected with molding compound by a ring nozzle (not shown) at a location 7.

Figure 4:
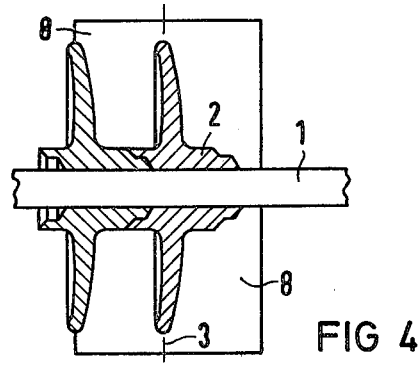
FIG. 4 shows a schematic cross-sectional view of insulator discs formed with a slider tool.

FIG. 4 shows a slider tool 8 which permits locking and passage of insulator core rod 1, as well as direct molding thereon of additional insulator discs. The figure shows the manner in which slider tool 8 permits the insulator discs to be molded and coupled with previously molded insulator discs.

Figure 5:
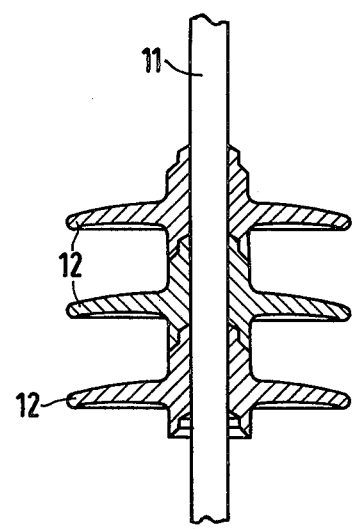
FIG. 5 shows a cross-sectional view of an electrical insulator manufactured in accordance with the invention.

FIG. 5 shows a completed electrical insulator disposed around an insulator core rod 11. The completed electrical insulator is provided with a plurality of axially arranged insulator discs 12.

Although the inventive concept disclosed herein has been described in terms of specific embodiments and applications, other applications and embodiments will be obvious to persons skilled in the pertinent art without departing from the scope of the invention. The drawings and descriptions of specific embodiments of the invention in this disclosure are illustrative of applications of the invention and should not be construed to limit the scope thereof.

What is claimed is:

1. A method for manufacturing a plastic electrical insulator for use outdoors, the electrical insulator having a fiberglass-reinforced plastic core rod, and an insulator disc surrounding the plastic core rod, the insulator disc being formed of an electrically insulating plastic molding compound, the method comprising the step of:

molding the insulator disc in a mold having a mold separation plane, an outer edge of the disc being situated near the mold separation plane; and surrounding the insulation core rod with A multiply divided tool and a glider tool to form at least one further insulator disc, said further insulator disc being molded so as to partially overlap the previously molded insulator disc.

2. The method of claim 1 comprising the further step of injecting the electrically insulating plastic molding compound at a point in said mold near said mold separation plane.

3. The method of claim 1 comprising the further step of injecting the electrically insulating plastic molding compound into said mold at a point lateral to said mold separation plane.

4. The method of claim 1 comprising the further steps of pretreating a surface of the insulator core rod, and providing the region where the insulator core rod joins the insulator disc with a selectable one of a hardenable layer, an adhesive, and an adhesion-promoting agent.

* * * * *